United States Patent
Nagata (10) Patent No.: US 6,890,195 B2
(45) Date of Patent: May 10, 2005

(54) PUSH-PUSH TYPE CARD CONNECTOR

(75) Inventor: Takayuki Nagata, Higashiosaka (JP)

(73) Assignee: Hosiden Corporation, Yao (JP)

(*) Notice: Subject to any disclaimer, the term of this patent is extended or adjusted under 35 U.S.C. 154(b) by 0 days.

(21) Appl. No.: 10/730,989

(22) Filed: Dec. 10, 2003

(65) Prior Publication Data

US 2004/0127079 A1 Jul. 1, 2004

(30) Foreign Application Priority Data

Dec. 27, 2002 (JP) ......................................... 2002-380206

(51) Int. Cl.$^7$ ............................................. H01R 13/62
(52) U.S. Cl. ...................................................... 439/159
(58) Field of Search ......................................... 439/159

(56) References Cited

U.S. PATENT DOCUMENTS 6,520,783 B2 * 2/2003 Hsu ............................ 439/157
6,652,300 B2 * 11/2003 Nishioka ..................... 439/159
6,776,632 B2 * 8/2004 Kikuchi et al. ............. 439/159
6,776,640 B2 * 8/2004 Nishioka ..................... 439/325

FOREIGN PATENT DOCUMENTS

JP          3083778         6/2000
JP          2002-134224     5/2002

* cited by examiner

Primary Examiner—Phuong Dinh
(74) Attorney, Agent, or Firm—Bacon & Thomas

(57) ABSTRACT

In a card connector, with a simple countermeasure, wherein the shape of a bottom face of an escape path in a cam body is slightly changed, accidental ejection of a card due to a drop impact or the like hardly occurs, without impairing the card insertion operability. A slider is longitudinally movably attached to a case. The card connector has a cam mechanism having functions of locking the slider to a pushed position, and canceling the locked state at the pushed position. The cam mechanism has an engagement pin and a cam body. A loop groove of the cam body has an engagement portion, an escape path, and a stepped surface. An engagement end of the engagement pin is elastically pressed against a bottom face of the escape path. The bottom face of the escape path has an inclined surface of a rising gradient which is directed toward an upper edge of the stepped surface.

6 Claims, 12 Drawing Sheets

PUSH-PUSH TYPE CARD CONNECTOR

BACKGROUND OF THE INVENTION

1. Field of the Invention

The present invention relates to a card connector, and more particularly to a so-called push-push type card connector in which positioning of a card to a card set position, and ejection of the card from the card set position are alternately conducted by repeating an operation of pushing the card.

2. Description of the Prior Art

Conventionally, card connectors configured in the following manner are known. When an initial pushing operation is conducted on a card inserted into a card insertion space of a case, a slider is pushed from a standby position to a pushed position, and the slider which reaches the pushed position is locked to the position so that the card is positioned to a card set position. By contrast, when a second pushing operation is conducted on the card, the locked state of the slider is canceled, and the card is retracted together with the slider to be ejected. In some of such card connectors, the functions of locking the slider and canceling the locked state are realized by a cam mechanism. The cam mechanism is configured as shown in FIGS. 12 and 13.

Figure 12:
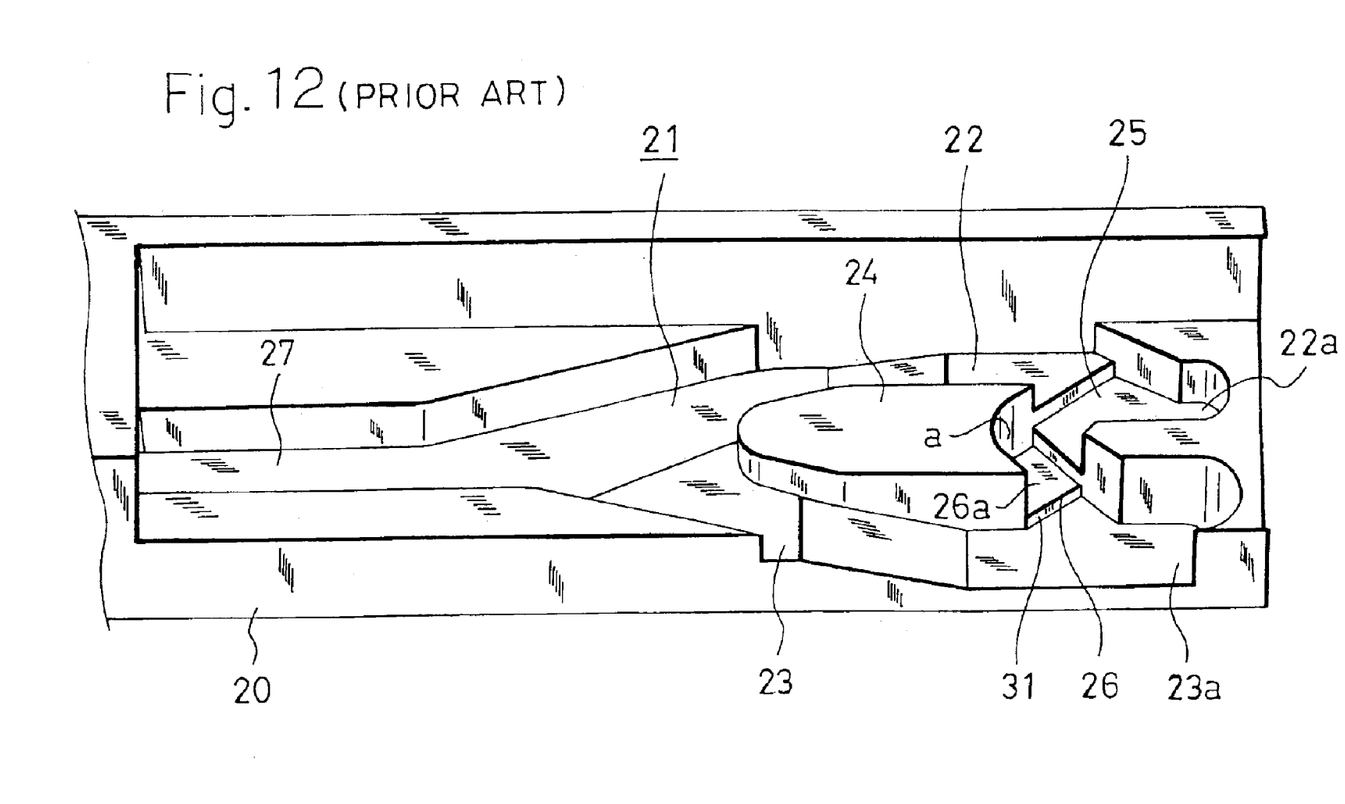
FIG. 12 is a schematic perspective view showing a cam body of a cam mechanism employed in a conventional card connector.
Figure 13:
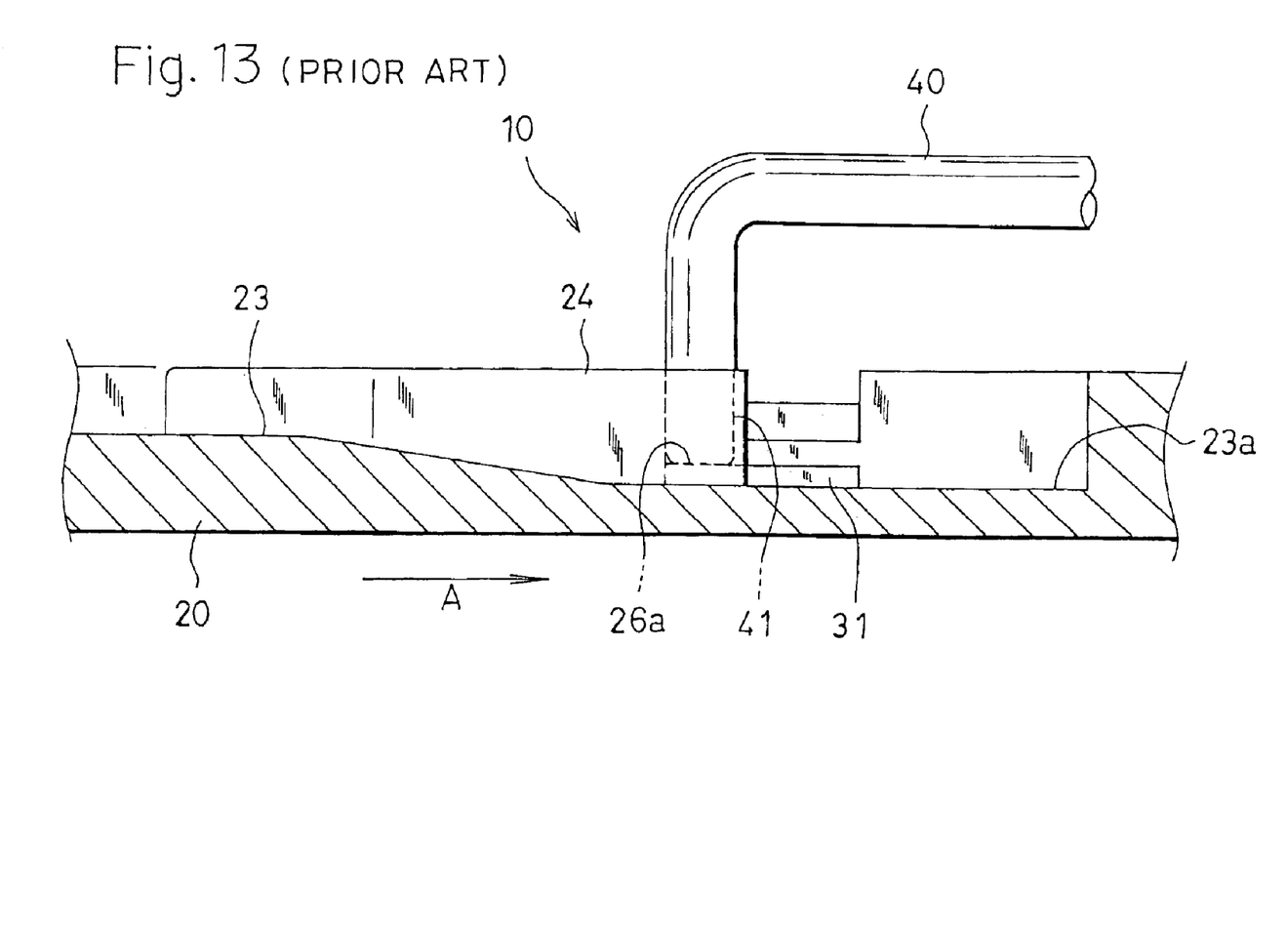
FIG. 13 is a longitudinal side section view showing main portions of a cam mechanism 10 comprising the cam body of FIG. 12.

FIG. 12 is a schematic perspective view showing a cam body 20 of a cam mechanism 10 which is employed in a conventional card connector, and FIG. 13 is a longitudinal side section view showing main portions of the cam mechanism 10.

The cam mechanism 10 comprises the cam body 20, and an engagement pin 40 which is formed by bending an elastic wire member. A loop groove 21 is formed in the cam body 20. The loop groove 21 comprises: a forward path 22; a return path 23; a protruding engagement portion 24 which is formed between the paths; a lead-in path 25 which elongates from a forward-path end portion 22a to the engagement portion 24; and an escape path 26 which elongates from the engagement portion 24 to a return-path start portion 23a. The loop groove 21 is formed into a slender heart shape as a whole, and the lead-in path 25 and the escape path 26 form a heart-shape recess.

In the cam mechanism 10, the cam body 20 is resiliently urged in the direction of the arrow A of FIG. 12 by an urging force indicated by the arrow A. By contrast, a basal portion (not shown) of the engagement pin 40 is swingably supported at a constant position, and an engagement end 41 at the tip end of the pin is always fitted into the loop groove 21. At the initial position, the engagement end 41 is positioned in a junction 27 of the start portion of the forward path 22 and the end portion of the return path 23 (this state is not shown in the figures). The engagement pin 40 is always elastically pressed against a bottom face of the loop groove 21 by the elasticity of the pin itself or by a spring piece which is not shown.

When, in a state where the engagement end 41 of the engagement pin 40 is positioned in the junction 27 of the loop groove 21, the cam body 20 is pushed against the urging force A, the engagement end 41 moves along the forward path 22 of the loop groove 21 to reach the forward-path end portion 22a. When the pushing force is canceled at this timing, the cam body 20 is pushed back by the urging force A, so that the engagement end 41 moves along the lead-in path 25 and is then engaged with the engagement portion 24 as shown in FIG. 12. When the cam body 20 is then pushed against the urging force A, the engagement end 41 moves along the escape path 26 to reach the return-path start portion 23a. When the pushing force is canceled at this timing, the cam body 20 is pushed back by the urging force A, so that the engagement end 41 moves along the return path 23 and then returns to the junction 27.

In the conventional card connector, the cam body 20 is disposed integrally with a slider (not shown) which is longitudinally movably attached to a case (not shown) forming a card insertion space, and the urging force A is applied to the slider. The slider is configured so that it is pushed by a card which is inserted into the card insertion space, to be moved from a standby position to a pushed position corresponding to the card set position. Then, the engagement end 41 is engaged with the engagement portion 24 as shown in FIG. 13, whereby the slider is locked to the pushed position. Therefore, the card is positioned to the card set position by the first card pushing operation, and terminals of the card are in contact with contacts disposed in the case so as to make electrical connections therebetween. By contrast, when, in the state where the slider is locked, the slider is pushed by the card, the engagement end 41 moves along the escape path 26 to be disengaged from the engagement portion 24 as described above, so that the locked state of the slider is canceled. Then, the engagement end 41 returns via the return path 23 to the junction 27, whereby the card is ejected. Therefore, the locked state of the slider is canceled by the second card pushing operation, and the card which has been positioned to the card set position is ejected.

As seen from FIGS. 12 and 13, the cam mechanism 10 which is employed in the conventional card connector comprises a stepped surface 31 in the boundary between the escape path 26 of the loop groove 21 of the cam body 20 and the return path 23. After the engagement end 41 moves along the escape path 26 and reaches the return-path start portion 23a, during retraction of the cam body 20, the stepped surface 31 slides in contact with the engagement end 41, whereby the engagement end 41 is retained in the return path 23, so that the engagement end 41 is prevented from reversely moving to a position a where the engagement end is to be engaged with the engagement portion 24. A bottom face 26a of the escape path 26 is formed as a horizontal surface. In the second card pushing operation, therefore, the engagement end 41 which is elastically pressed against the horizontal bottom face 26a of the escape path 26 by the function of the spring piece slides on the bottom face 26a and passes over the stepped surface 31 to reach the return-path start portion 23a.

A prior art example discloses a structure in which a cam mechanism which is similar to the cam mechanism 10 is employed so that a slider is locked or the locked state is canceled (for example, see Japanese Patent No. 3,083,778).

Another prior art example discloses a structure in which a cam mechanism which is similar to the cam mechanism 10 is employed so that a slider is locked or the locked state is canceled. The other prior art example discloses also a structure in which means for directly engaging an elastic lock piece of the slider with a notch of a card is employed as means for positioning the card to a card set position, and an engagement end of an engagement pin of the cam mechanism is elastically pressed against a bottom face of a loop groove on the side of a cam body by a spring piece formed by stamping and raising a metal cover constituting a case (for example, see Japanese Patent Application Laying-Open No. 2002-134224).

SUMMARY OF THE INVENTION

In the cam mechanism 10 shown in FIGS. 12 and 13, in the state where the slider is locked to the pushed position, i.e., the state where the engagement end 41 of the engagement pin 40 is engaged with the engagement portion 24 of the cam body 20, the engagement portion 24 is pushed against and engaged with the engagement end 41 by the urging force A, and hence there does not occur a situation where the slider is retracted and the card is ejected. When any force such as a reaction due to a drop impact which is larger than the urging force A is applied to the slider in the direction opposite to the urging force A, however, a situation where the engagement end 41 moves along the escape path 26 to escape into the return-path start portion 23a in the same manner as the case of the second card pushing operation may possibly occur. As a result, there occurs a situation where the locked state of the slider is canceled and the card is accidentally ejected. Particularly, the cam mechanism has the structure in which the bottom face 26a of the escape path 26 is a horizontal surface, and the level relationships are set with setting the stepped surface 31 as a boarder so that the bottom face 26a of the escape path 26 is higher and the bottom face of the return path 23 is lower. As a result, circumstances in which such a situation is allowed to easily occur are produced. When a situation where the locked state of the slider is canceled and the card is accidentally ejected occurs, electrical connections between the terminals of the card and the contacts of the case are interrupted, thereby producing the possibility that electronic components of the card and an apparatus are adversely affected.

The above-mentioned prior art examples similarly have this problem. Particularly, the technique disclosed in the other prior art example of Japanese Patent Application Laying-Open No. 2002-134224 cannot solve the problem because of the following reason. The card is prevented from being accidentally ejected by engaging the elastic lock piece with the card in the card set position, the elastic lock piece is disposed on the slider. When the locked state of the slider at the pushed position is once canceled, therefore, the card also is ejected together with the slider.

SUMMARY OF THE INVENTION

It is an object of the invention to provide a card connector in which, even when only a simple countermeasure such as a slight modification of a cam mechanism is taken, accidental ejection of a card due to a drop impact or the like hardly occurs.

The card connector of the invention comprises: a slider which is longitudinally movably attached to a case forming a card insertion space, the slider being to be pushed by a card which is inserted into the card insertion space, to be moved from a standby position to a pushed position corresponding to a card set position, the slider being resiliently urged at the pushed position in a direction of ejecting the card; and a cam mechanism having functions of locking the slider to the pushed position, and canceling the locked state where the slider is locked to the pushed position. The cam mechanism has: an engagement pin attached to one of the case and the slider; and a cam body disposed on another one of the case and the slider, and comprising a loop groove into which an engagement end of the engagement pin is relatively displaceably fitted. The loop groove of the cam body comprises: a protruding engagement portion which is to be engaged with the engagement end that has passed through a forward path of the loop groove, thereby locking the slider to the pushed position corresponding to the card set position; an escape path which, when the slider at the pushed position is further pushed, allows the engagement end to escape from a position of engagement with the engagement portion to a start portion of a return path of the loop groove; and a stepped surface which, when the slider is to be retracted, is engaged with the engagement end that escapes to the start portion of the return path, to block the engagement end from reversely moving, thereby retaining the engagement end in the return path. The engagement end is elastically pressed against a bottom face of the escape path. The above configuration is identical with that of the conventional example shown in FIGS. 12 and 13.

In the invention, the above configuration is further provided with a configuration in which the bottom face of the escape path has an inclined surface of a rising gradient which is directed toward an upper edge of the stepped surface.

As described above, the configuration in which the bottom face of the escape path has a rising inclined surface which is directed toward an upper edge of the stepped surface is added. When the engagement end of the engagement pin moves from the position of engagement with the engagement portion to the return-path start portion along the escape path, therefore, the rising inclined surface provides the engagement end which slidingly moves while being elastically pressed against the inclined surface, with a resistance (movement resistance), so that the engagement end hardly escapes from the engagement position to the return-path start portion by a reaction due to a drop impact or the like. As a result, a situation where the engagement end is disengaged from the engagement portion because of a drop or the like to cancel the locked state of the slider hardly occurs, and also a situation where the card which has been positioned to the card set position is accidentally ejected hardly occurs.

In the invention, at the position of engagement of the engagement end with the engagement portion, the loop groove may be formed at a depth which is equal to a depth of the return-path start portion, or at a depth which is larger than a depth of the return-path start portion. In the configuration in which the depth of the loop groove at the engagement position is equal to that of the return-path start portion, as compared with that shown in FIG. 12 in which the depth of the loop groove at the engagement position a is smaller than that of the return-path start portion 23a, the engagement width of the engagement end 41 with respect to the engagement portion 24 is larger, and hence a situation where the engagement end 41 passes over the engagement portion 24 hardly occurs, with the result that the stability of the locked state of the slider at the pushed position is improved. When the depth of the loop groove at the engagement position a is equal to that at the return-path start portion 23a, the engagement position a becomes equal to the return-path start portion 23a which is the deepest portion in the conventional example shown in FIGS. 12 and 13, and hence the other portions of the loop groove 21 can be made shallower. According to the configuration, in the case where the cam body 20 is molded integrally with the slider 70, when the loop groove 21 is made shallower, the slider 70 can be easily thinned. By contrast, in the configuration where the depth of the loop groove at the engagement position is larger than that of the return-path start portion, the rising gradient of the inclined surface is larger than that in the case where the depths are equal to each other. Therefore, the movement resistance on the inclined surface when the engagement end moves along the escape path to enter the return-path start portion is large. As a result, the engagement end hardly escapes from the engagement position to the return-path start portion by a reaction due to a drop impact or the like, and a situation where the engagement end is disengaged from the engagement portion because of a drop or the like to cancel the locked state of the slider hardly occurs. Moreover, also a situation where the card which has been positioned to the card set position is accidentally ejected hardly occurs.

In the invention, preferably, the upper edge of the stepped surface is divided into one edge which elongates along a bottom face of the return-path start portion, and another edge of a falling gradient which elongates from an end of the one edge toward a root of the engagement portion, and the inclined surface is divided into one inclined surface of a rising gradient which extends toward the one edge, and another inclined surface of a rising gradient which extends toward the other edge. Preferably, a base of the other inclined surface crosses the escape path, and a base of the one inclined surface is positioned on a step-like wall face which is opposed to the engagement portion to form the escape path. According to the invention, in the case where a single flat rising inclined surface is formed in the escape path, the rising gradient of the other inclined surface is larger than that of the single rising inclined surface. Therefore, the movement resistance on the other inclined surface when the engagement end moves along the escape path to enter the return-path start portion is large. As a result, the engagement end hardly escapes from the engagement position to the return-path start portion by a reaction due to a drop impact or the like, and a situation where the engagement end is disengaged from the engagement portion because of a drop or the like to cancel the locked state of the slider hardly occurs. Moreover, also a situation where the card which has been positioned to the card set position is accidentally ejected hardly occurs. The functions of the invention will be described in more detail with reference to the following embodiment.

In the invention, preferably, the case has a body, and a sheet metal cover which is attached to the body, and a spring piece which is formed by inwardly stamping and raising the cover is in elastic contact with the engagement pin, whereby the engagement end is elastically pressed against the bottom face of the escape path. According to the configuration, an additional component(s) for elastically pressing the engagement end against the bottom face of the escape path is not required.

According to the invention, although only a simple countermeasure that the configuration of the cam mechanism, or specifically the shape of the bottom face of the escape path in the cam body is slightly changed is taken, an effect that accidental ejection of a card due to a drop impact or the like hardly occurs can be attained without impairing the card insertion operability.

DETAILED DESCRIPTION OF THE PREFERRED EMBODIMENT

Figure 1:
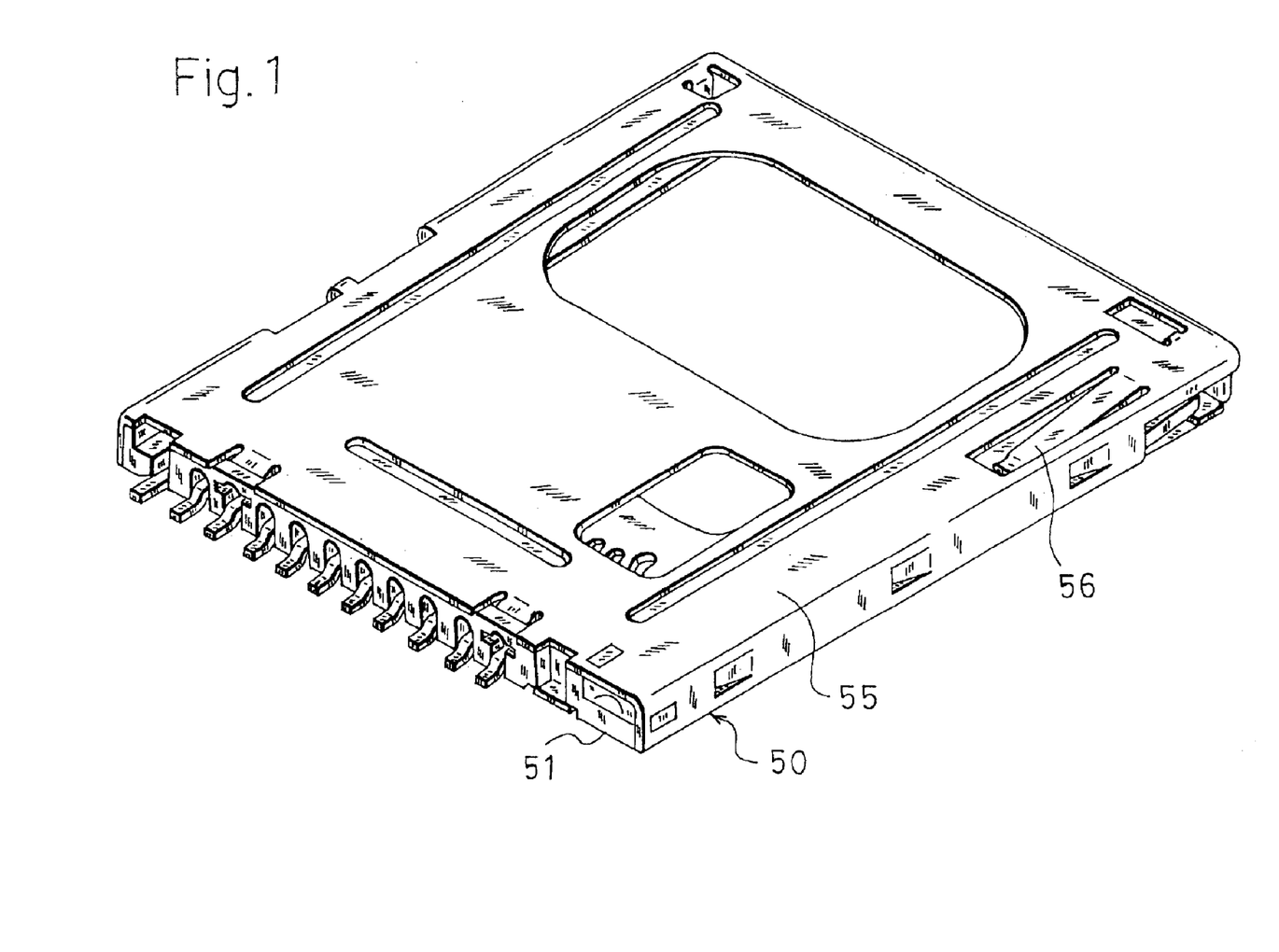
FIG. 1 is a schematic perspective view of a card connector of an embodiment of the invention.
Figure 2:
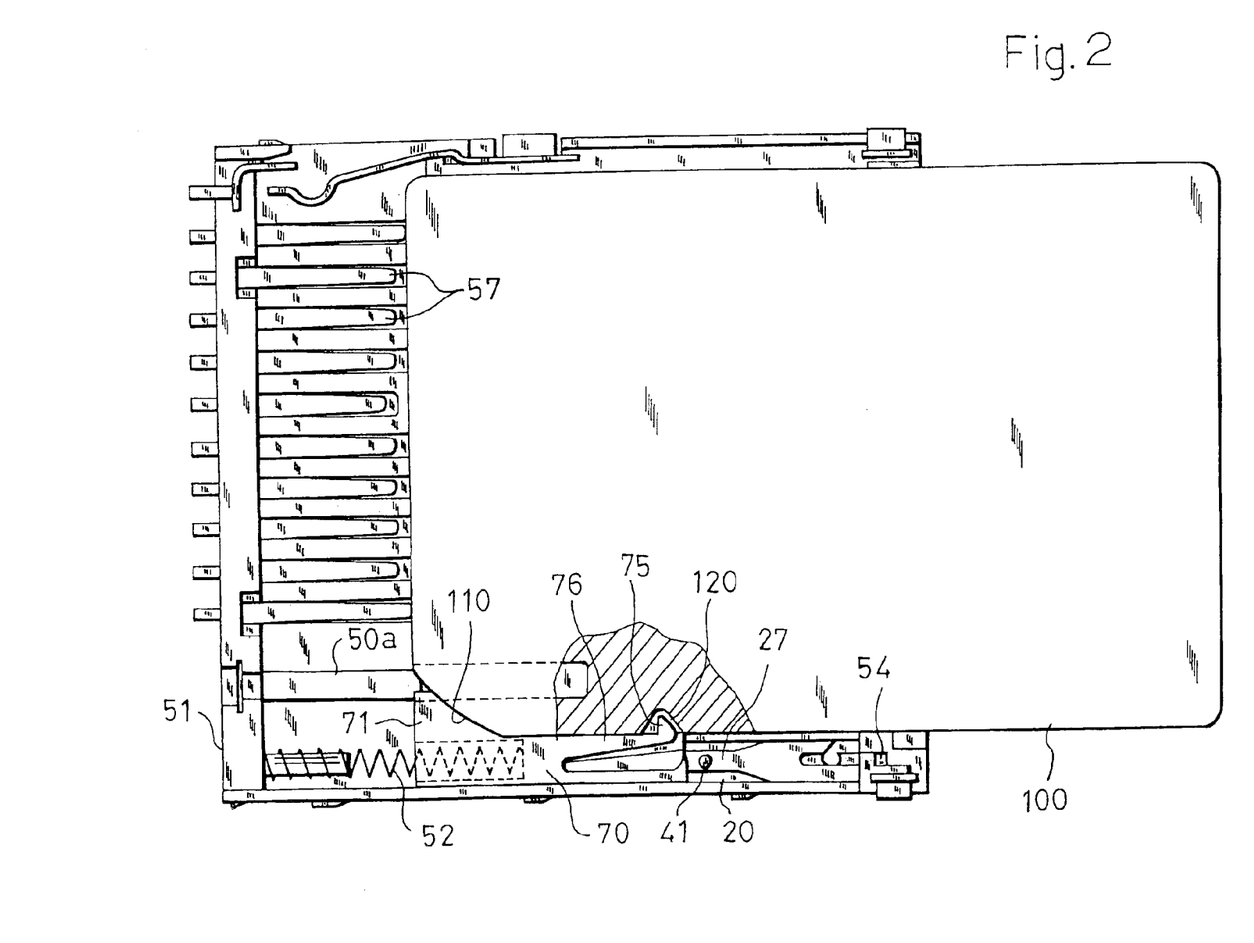
FIG. 2 is a partially cutaway plan view showing a state where a card is half locked to a slider at a standby position.
Figure 3:
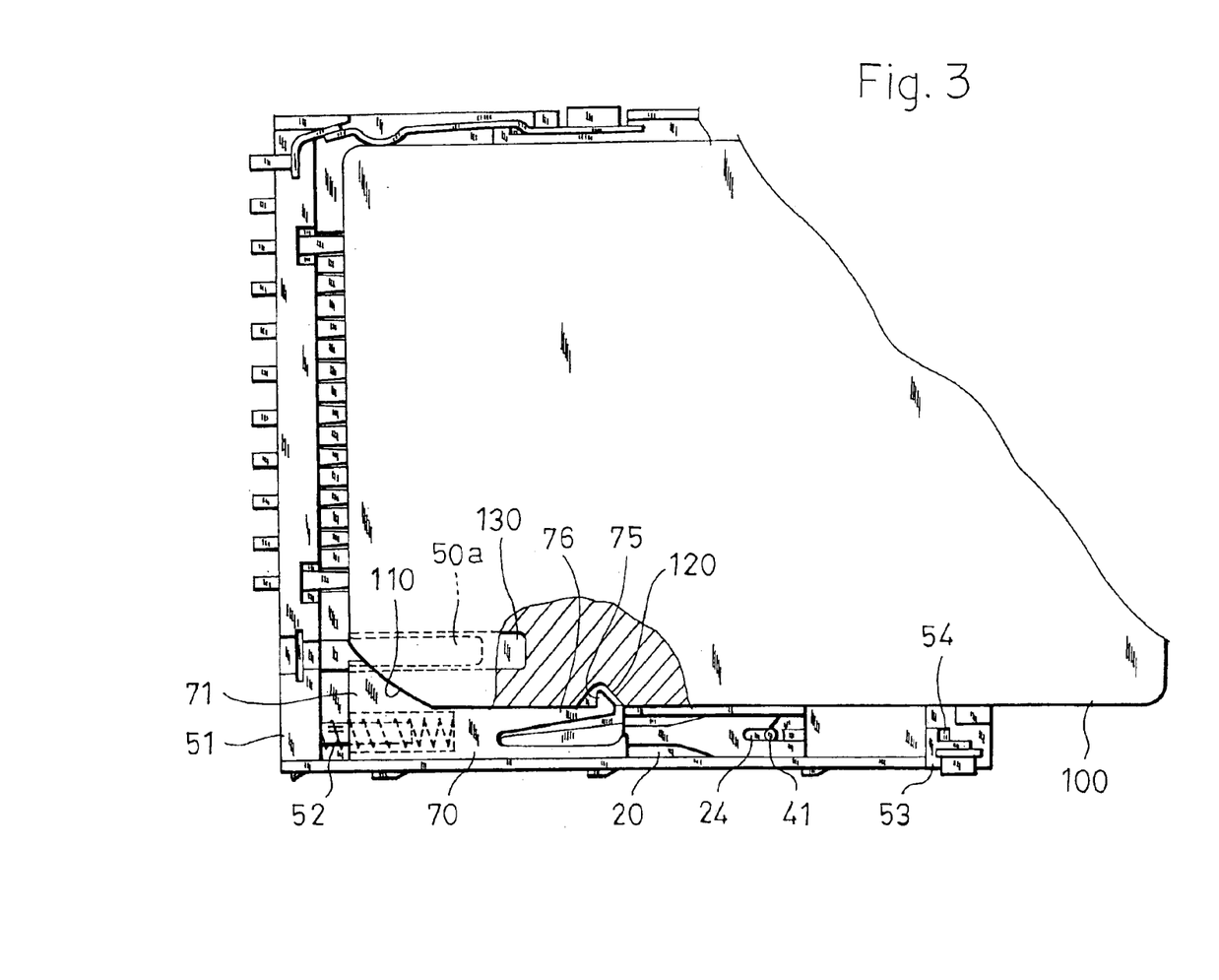
FIG. 3 is a partially cutaway plan view showing a state where the slider is pushed to a pushed position.
Figure 4:
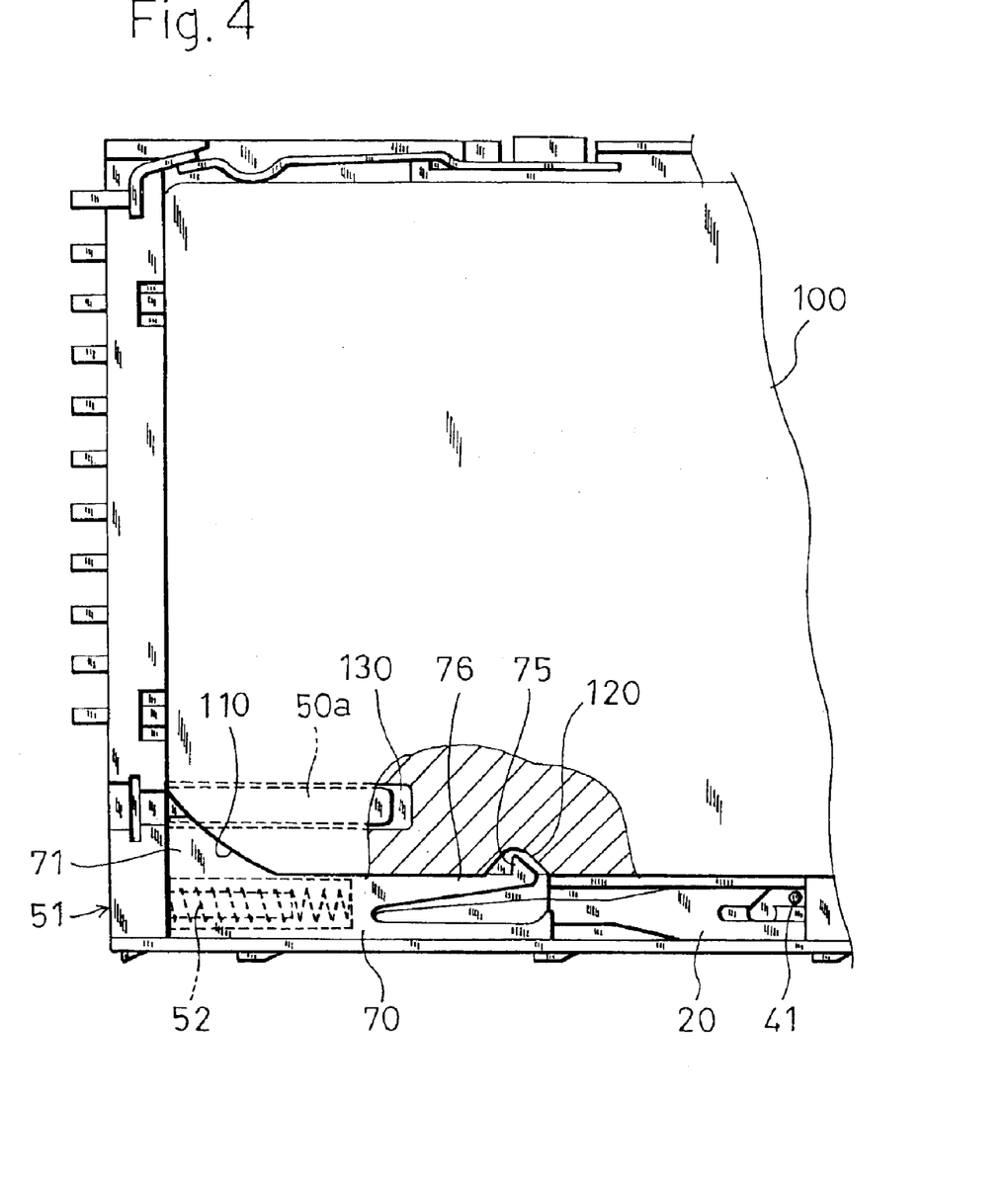
FIG. 4 is a partially cutaway plan view showing a state where a first pushing operation is conducted.
Figure 5:
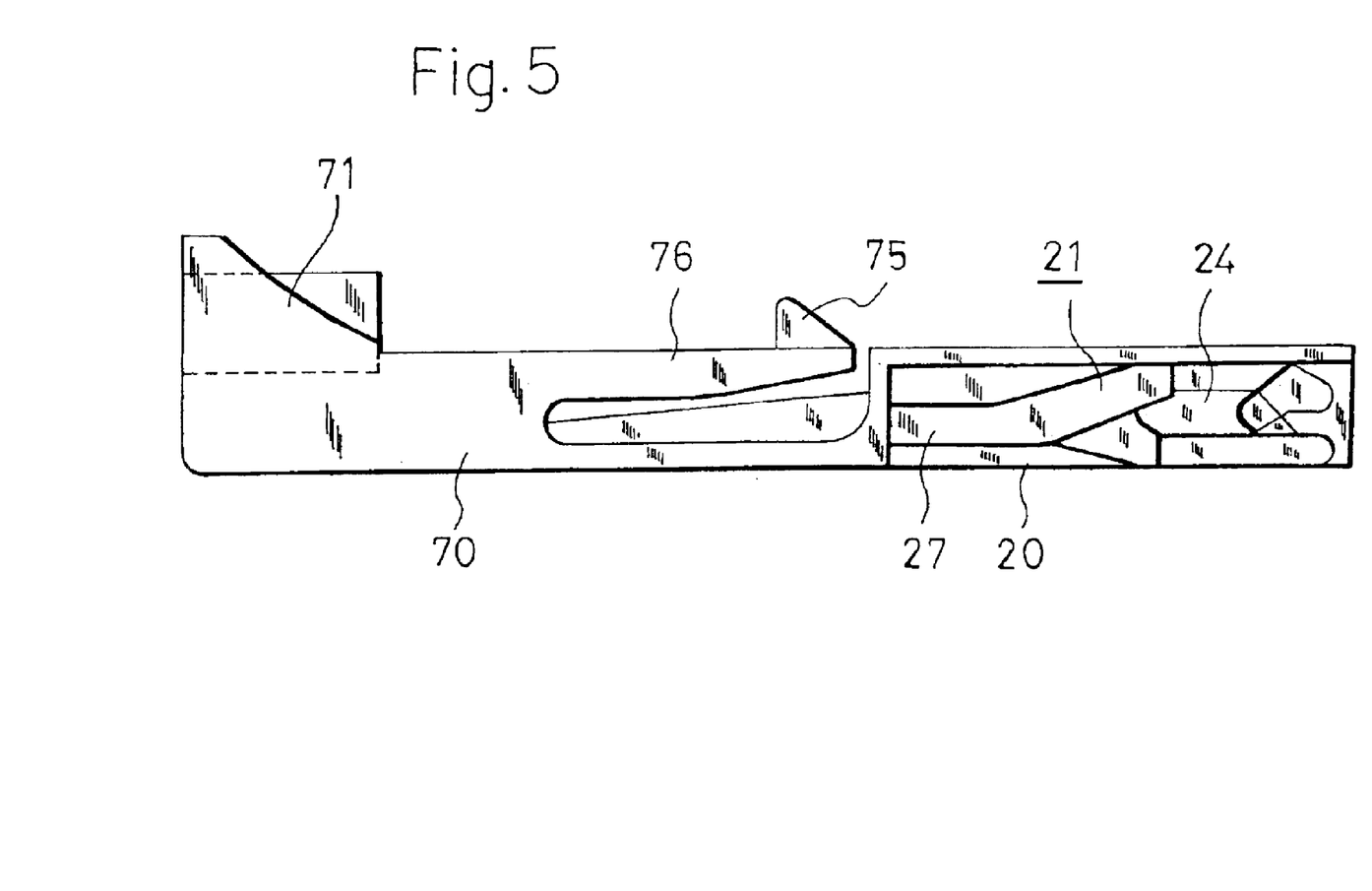
FIG. 5 is a plan view of the slider.
Figure 6:
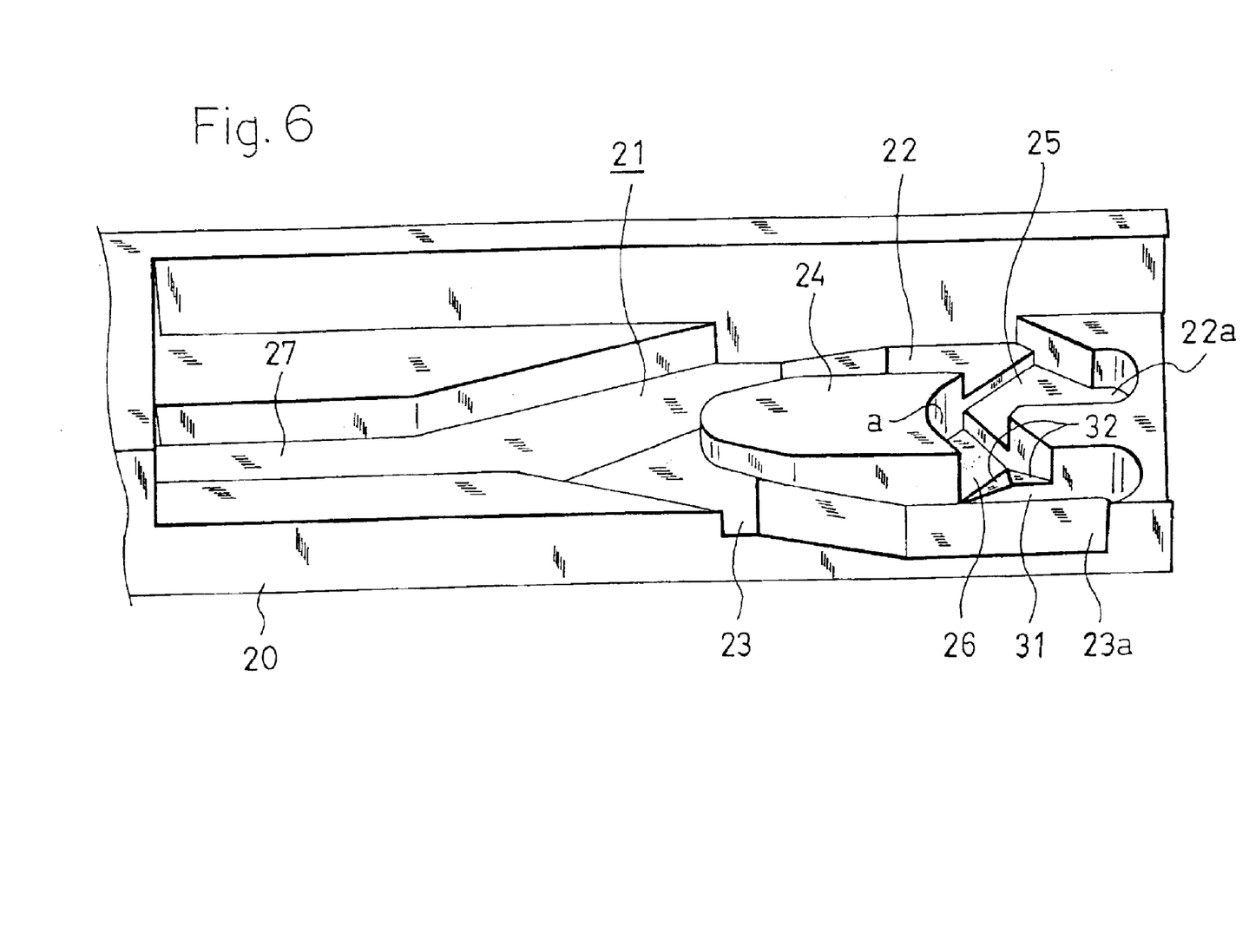
FIG. 6 is a perspective view of main portions of a cam body.
Figure 7:
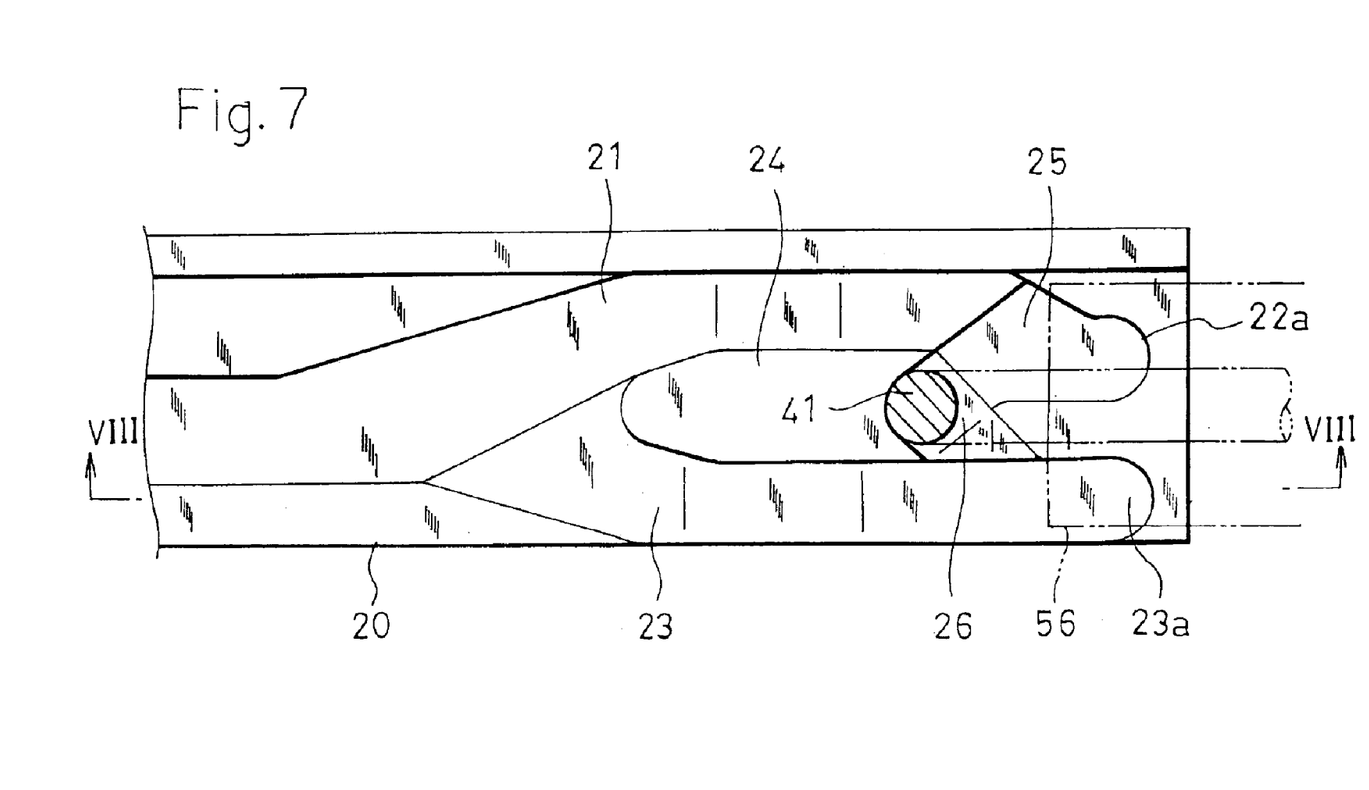
FIG. 7 is a plan view of main portions of a cam mechanism.
Figure 8:
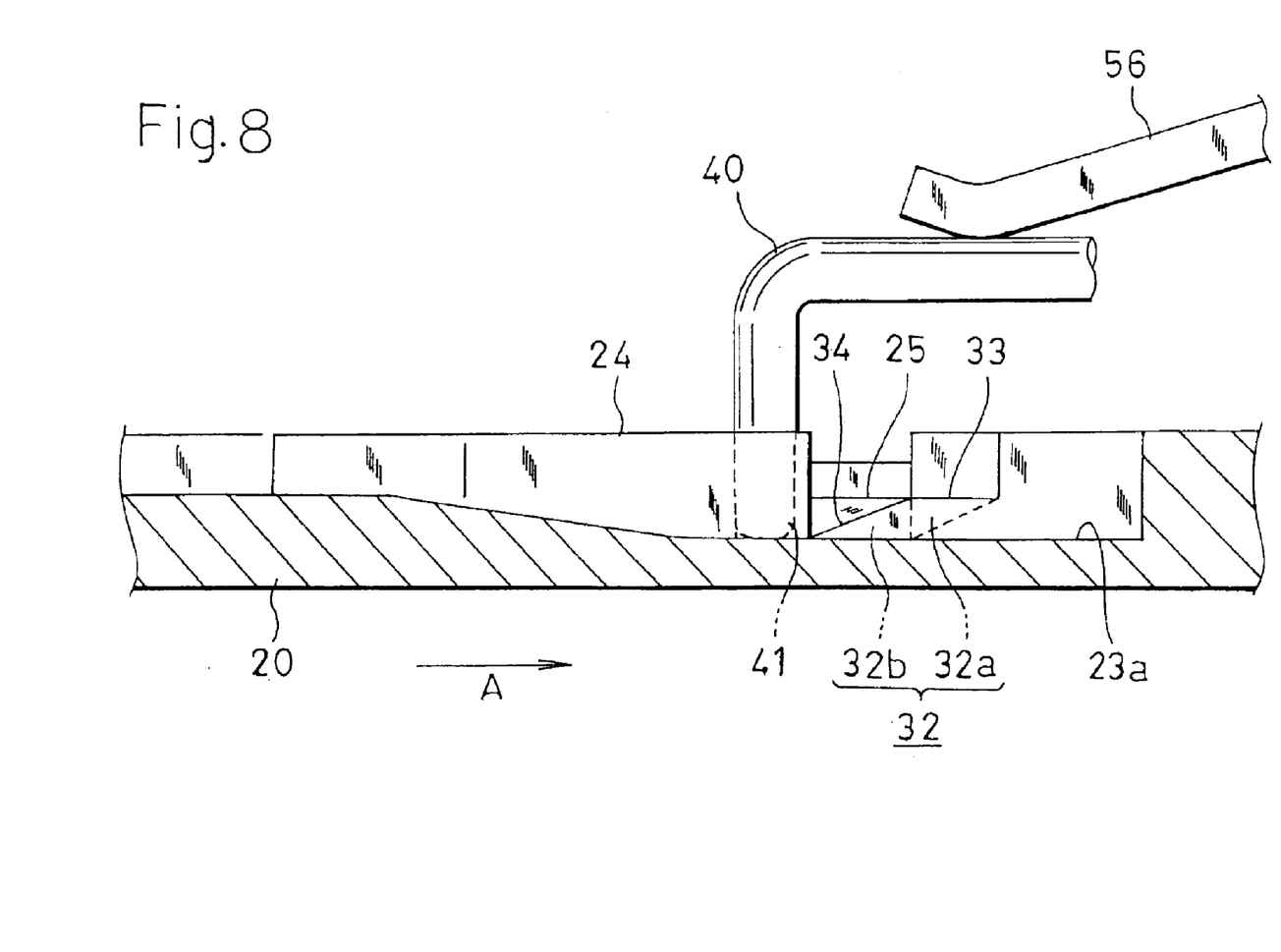
FIG. 8 is a section view taken along the line VIII—VIII of FIG. 7.
Figure 9:
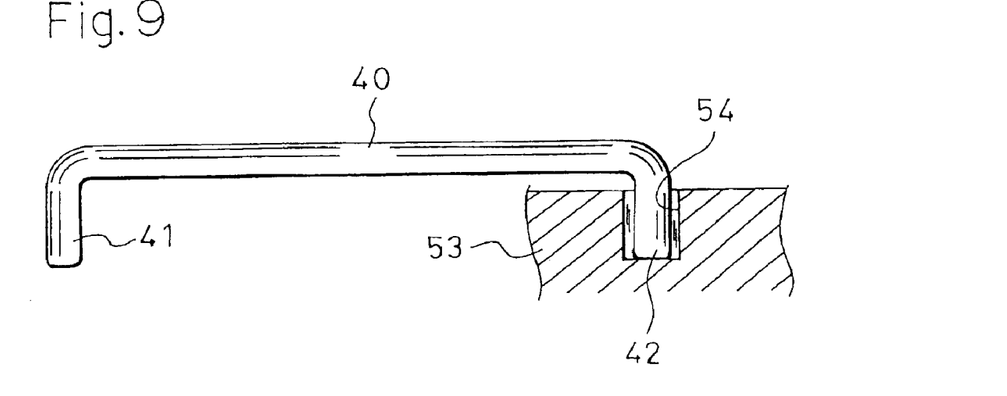
FIG. 9 is a view illustrating a portion where an engagement pin is coupled to a body.
Figure 10:
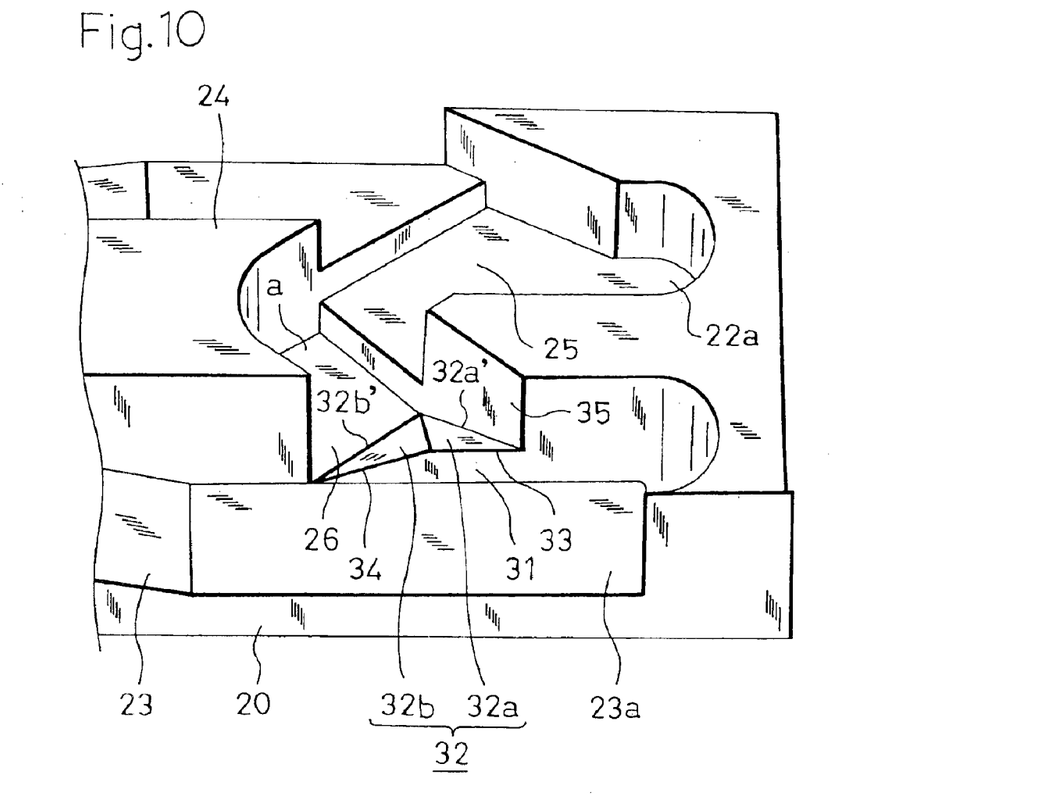
FIG. 10 is a perspective view showing the shape of an inclined surface.
Figure 11:
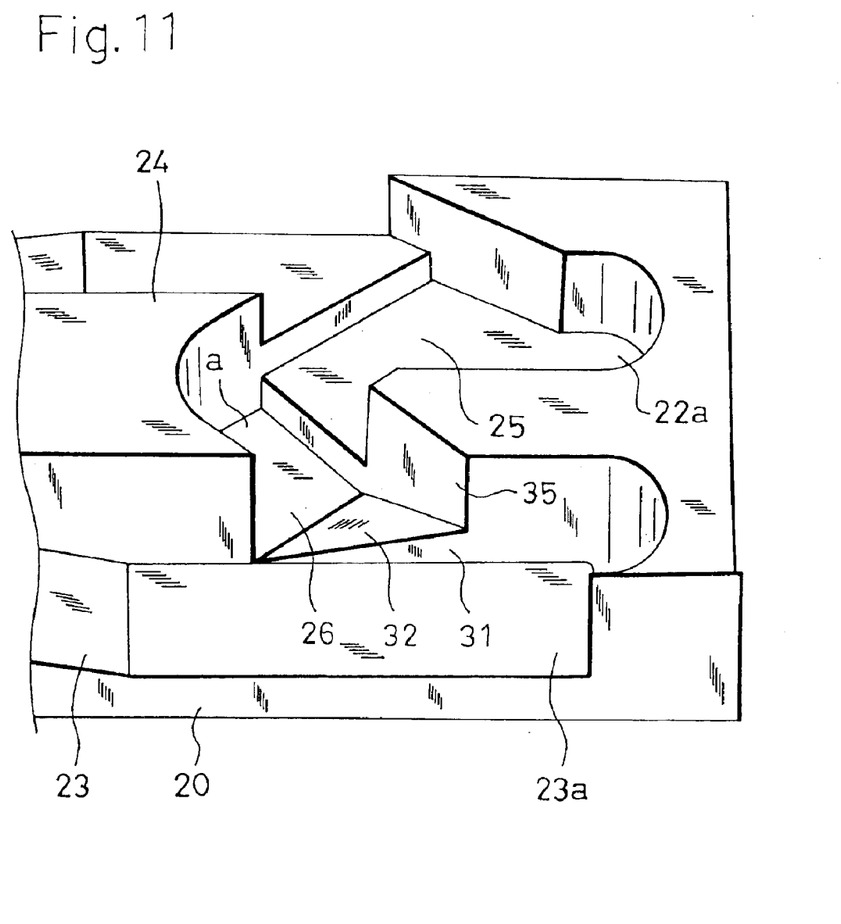
FIG. 11 is a perspective view showing the shape of the inclined surface in a modification.

FIG. 1 is a schematic perspective view of a card connector of an embodiment of the invention, FIG. 2 is a partially cutaway plan view showing a state where a card 100 is half locked to a slider 70 at a standby position, with omitting a cover 55 of a case 50, FIG. 3 is a partially cutaway plan view showing a state where the slider 70 is pushed to a pushed position by the card 100, with omitting the cover 55 of the case 50, FIG. 4 is a partially cutaway plan view showing a state where a first pushing operation is conducted on the card 100, with omitting the cover 55 of the case 50, FIG. 5 is a plan view of the slider 70, FIG. 6 is a perspective view of main portions of a cam body 20, FIG. 7 is a plan view of main portions of a cam mechanism 10, FIG. 8 is a section view taken along the line VIII—VIII of FIG. 7, FIG. 9 is a view illustrating a portion where an engagement pin 40 is coupled to a body 51, FIG. 10 is a perspective view showing the shape of an inclined surface 32, and FIG. 11 is a perspective view showing the shape of the inclined surface 32 in a modification.

As shown in FIG. 1, the card connector has a case 50 comprising: a body 51 formed by a molded product of a synthetic resin; and a sheet metal cover 55 which is attached to the body 51. A card insertion space which is surrounded by the body 51 and the cover 55, and which comprises a card insertion port (slot) is formed inside the case 50. As shown in FIG. 2, a large number of contacts 57 are laterally arranged in a front end portion of the body 51. The contacts 57 are in elastic contact with terminals of the card 100 which is inserted into the card insertion space to reach a card set position, thereby making electrical connections therebetween. The body 51 further comprises a rib-like projection 50a for preventing a card from being erroneously inserted. As shown in FIGS. 3 and 4, when the card 100 in an adequate posture is inserted into the card insertion space, the projection 50a is accommodated in a groove 130 formed in the card 100. By contrast, when the card 100 in an inverted posture is inserted into the card insertion space, the projection 50a bumps against the tip end of the card 100, thereby preventing the card 100 from being erroneously inserted.

As shown in FIGS. 2 to 4, the slider 70 is placed inside the case 50, and always rearward urged by a spring member 52 configured by a coil spring. When the rear end of the slider 70 butts against a projection 53 of the rear end of the body 51, the slider 70 is positioned to the standby position. As shown in FIG. 5, the slider 70 comprises an inward protrusion 71 in a front end portion. The protrusion 71 receives a front end corner 110 of the card 100 which is inserted into the card insertion space of the case 1 as shown in FIG. 2. A cantilevered elastic piece 76 which has a mountain-like engaging portion 75 at the tip end is molded integrally with the slider 70.

As seen from FIGS. 5 to 8, the cam mechanism 10 comprises an engagement pin 40 which is formed by bending an elastic wire member into a low-profile portal shape. In contrast to the cam body 20 which is molded integrally with the slider 70 as shown in FIG. 5, a rear end leg 42 of the engagement pin 40 is rotatably fittingly supported by a support hole 54 (see FIGS. 2 or 3) which is formed in the projection 53 of the body 51 as shown in FIG. 9. A front end portion of the engagement pin 40 is formed as an engagement end 41.

A loop groove 21 of the cam body 20 is formed into a generally similar shape as the loop groove which has been described with reference to FIG. 11. Specifically, as shown in FIGS. 6 and 7, the loop groove 21 comprises: a forward path 22; a return path 23; a protruding engagement portion 24 which is formed between the paths; a lead-in path 25 which elongates from a forward-path end portion 22a to the engagement portion 24; and an escape path 26 which elongates from the engagement portion 24 to a return-path start portion 23a. The loop groove 21 is formed into a slender heart shape as a whole, and the lead-in path 25 and the escape path 26 form a heart-shape recess. When the engagement end 41 of the engagement pin 40 is fitted into the loop groove 21 and the slider 70 is positioned at the standby position, the engagement end 41 is positioned at an initial position which coincides with a junction 27 of the start portion of the forward path 22 and the end portion of the return path 23 as shown in FIG. 2. A spring piece 56 which is formed by inwardly stamping and raising the cover 55 is placed on the engagement pin 40. The engagement end 41 of the engagement pin 40 is always elastically pressed against the bottom face of the loop groove 21 by the elasticity of the spring piece 56.

In this configuration, when the front end corner 110 of the card 100 which is inserted in an adequate posture into the card insertion space as shown in FIG. 2 rides over the mountain-like engaging portion 75 of the slider 70 that is retracted to the standby position by the spring member 52, the mountain-like engaging portion 75 is fitted into a recess 120 formed in the card 100. This state is a half-locked state of the card 100. In the half-locked state, the card 100 is prevented from being freely extracted, by the engagement of the recess 120 with the mountain-like engaging portion 75, and, when a pulling force of a certain degree is applied to the card 100, the card 100 is caused to ride over the mountain-like engaging portion 75 and then pulled out.

When a first pushing operation is applied on the card 100 in the state of FIG. 1, the cam body 20 is pushed together with the slider 70 by the card 100 against the urging force A of the spring member 52, and the engagement end 41 of the engagement pin 40 moves along the forward path 22 with starting from the junction 27 of the loop groove 21 to reach the forward-path end portion 22a (the position of the slider 70 at this timing is shown in FIG. 4). When the pushing force is canceled at this timing, the cam body 20 is pushed back together with the slider 70 by the urging force A, so that the engagement end 41 moves along the lead-in path 25 and is then engaged with the engagement portion 24 as shown in FIGS. 7 and 8 (the position of the slider 70 at this timing is shown in FIG. 3). When a second pushing operation is then applied on the card 100, the cam body 20 is pushed together with the slider 70 against the urging force A, and the engagement end 41 moves along the escape path 26 to reach the return-path start portion 23a. When the pushing force is canceled at this timing, the cam body 20 is pushed back by the urging force A, so that the engagement end 41 moves along the return path 23 and then returns to the junction 27.

As a result of the push-push operation, the insertion of the card 100 to the card set position, and the ejection from the card set position are conducted. In the first card pushing operation, the slider 70 is pushed from the standby position to the pushed position corresponding to the card set position, and the engagement end 41 is engaged with the engagement portion 24 to lock the slider 70 to the pushed position, whereby the card 100 which is half locked to the slider 70 is positioned to the card set position, and terminals of the card are in contact with contacts disposed on the body 51 so as to make electrical connections therebetween. By contrast, in the second card pushing operation, the engagement end 41 moves along the escape path 26 and is then disengaged from the engagement portion 24, and hence the locked state of the slider 70 is canceled. Thereafter, the engagement end 41 returns through the return path 23 to the junction 27, whereby the card is ejected.

In the embodiment, as shown in FIGS. 6 to 8 and 10, the bottom face of the escape path 26 of the loop groove 21 of the cam body 20 comprises the inclined surface 32 of a rising gradient which is directed toward an upper edge of a stepped surface 31 that is located in the boundary between the escape path 26 and the return-path start portion 23a. In the embodiment, as shown in FIG. 10, the upper edge of the stepped surface 31 is divided into one edge 33 which is parallel to the bottom face of the horizontal return-path start portion 23a, and another edge 34 of a falling gradient which elongates from an end of the one edge 33 toward the root of the engagement portion 24, and the inclined surface 32 is divided into one inclined surface 32a of a rising gradient which extends toward the one edge 33, and another inclined surface 32b of a rising gradient which extends toward the other edge 34. A base 32b' of the other inclined surface 32b crosses the escape path 26, and a base 32a' of the one inclined surface 32a is positioned on a step-like wall face 35 which is opposed to the engagement portion 24 to form the escape path 26.

In the configuration where the bottom face of the escape path 26 comprises the rising inclined surface 32 which is directed toward the upper edge of the stepped surface 31, when the engagement end 41 which is engaged with the engagement portion 24 as shown in FIG. 8 moves from the engagement position a along the escape path 26 (see FIGS. 6 or 10) to the return-path start portion 23a, the rising inclined surface 32 provides the engagement end 41 which slidingly moves while being elastically pressed against the inclined surface 32 by the urging of the spring piece 56, with a movement resistance. In addition, the urging force A generated by the spring member 52 acts on the slider 70. Therefore, the engagement end 41 hardly escapes from the engagement position a to the return-path start portion 23a by a reaction due to a drop impact or the like. As a result, a situation where the engagement end 41 is disengaged from the engagement portion 24 because of a drop or the like to cancel the locked state of the slider 70 hardly occurs, and also a situation where the card 100 which has been positioned to the card set position is accidentally ejected hardly occurs.

In the embodiment, at the position a of engagement of the engagement end 41 with the engagement portion 24, the loop groove 21 is formed at a depth which is larger than that of the return-path start portion 23a. At the position a of the engagement of the engagement end 41 with the engagement portion 24, the depth of the loop groove 21 may be formed so as to be equal to that of the return-path start portion 23a. When the depth of the loop groove 21 at the engagement position a is made larger than that of the return-path start portion 23a, however, the rising gradients of the one inclined surface 32a and the other inclined surface 32b are larger than those in the case where the depths are equal to each other, and hence the movement resistances on the inclined surfaces 32a, 32b which are exerted when the engagement end 41 moves along the escape path 26 to the return-path start portion 23a are large. Therefore, the engagement end 41 hardly escapes from the engagement position a to the return-path start portion 23a by a reaction due to a drop impact or the like. As a result, a situation where the engagement end 41 is disengaged from the engagement portion 24 because of a drop or the like to cancel the locked state of the slider 70 very hardly occurs, and also a situation where the card 100 which has been positioned to the card set position is accidentally ejected very hardly occurs. In the configuration in which the depth of the loop groove 21 at the engagement position a is larger than that of the return-path start portion 23a, the engagement width of the engagement end 41 with respect to the engagement portion 24 is large, and hence a situation where the engagement end 41 slides over the engagement portion 24 hardly occurs, with the result that the stability of the locked state of the slider at the pushed position is improved. By contrast, in the configuration in which the depth of the loop groove 21 at the engagement position a is equal to that at the return-path start portion 23a, the engagement position a is equal to the return-path start portion 23a which is the deepest portion in the conventional example shown in FIGS. 12 and 13, and hence the depths of other portions of the loop groove 21 can be made small. When the loop groove 21 is made shallow, therefore, the slider 70 with which the cam body 20 is integrally molded can be easily thinned.

In the embodiment, the upper edge of the stepped surface 31 is divided into the one edge 33 which is parallel to the bottom face of the horizontal return-path start portion 23a, and the other edge 34 of a falling gradient which elongates from the end of the one edge 33 toward the root of the engagement portion 24, and the inclined surface 32 is divided into the one inclined surface 32a of a rising gradient which extends toward the one edge 33, and the other inclined surface 32b of a rising gradient which extends toward the other edge 34. By contrast, as in a modification shown in FIG. 11, the rising inclined surface 32 which is directed toward the upper edge of the stepped surface 31 may be formed by a single flat surface. In the configuration of FIG. 10 in which the inclined surface 32 is divided into the one inclined surface 32a and the other inclined surface 32b, as compared with that of FIG. 11 in which the inclined surface 32 is formed by the single flat surface, the rising gradient of the other inclined surface 32b is larger than that of the inclined surface 32 of FIG. 11, and hence the movement resistance on the other inclined surface 32b which is exerted when the engagement end 41 moves along the escape path 26 to the return-path start portion 23a is large. Therefore, the locked state of the slider 70 is hardly cancelled by a reaction due to a drop impact or the like.

As in the configuration of FIG. 10 in which the other edge 34 of the upper edge of the stepped surface 31 is inclined toward the root of the engagement portion 24, or that of FIG. 11 in which the upper edge of the stepped surface 31 is inclined toward the root of the engagement portion 24, the operation of the engagement end 41 in which the end moves from the escape path 26 to the return-path start portion 23a while sliding over the stepped surface 31 can be smoothly conducted although the configuration can generate the above-mentioned movement resistance. Abnormal noises are hardly produced when the end slides over the stepped surface.

In the above, the embodiment in which the cam body 20 of the cam mechanism 10 is placed on the slider 70, and the engagement pin 40 is placed on the case 50 has been described. Alternatively, the cam body may be placed on the case, and the engagement pin may be placed on the slider. In the above, the mountain-like engaging portion 75 which is used for half locking the card 100 inserted into the card insertion space is disposed on the cantilevered elastic piece 76 which is molded integrally with the slider 70. Alternatively, a tip end portion of a spring piece which is an additional component attached to the slider may be bent into a mountain-like shape so as to function as the mountain-like engaging portion.

In FIGS. 1 to 13, identical or corresponding components are denoted by the same reference numerals.

What is claimed is:

1. A card connector comprising: a slider which is longitudinally movably attached to a case forming a card insertion space, said slider being to be pushed by a card which is inserted into said card insertion space, to be moved from a standby position to a pushed position corresponding to a card set position, said slider being resiliently urged at said pushed position in a direction of ejecting the card; and a cam mechanism having functions of locking said slider to said pushed position, and canceling the locked state where said slider is locked to said pushed position, said cam mechanism has: an engagement pin which is attached to one of said case and said slider; and a cam body disposed on another one of said case and said slider, and comprising a loop groove into which an engagement end of said engagement pin is relatively displacealby fitted, said loop groove of said cam body comprises: a protruding engagement portion which is to be engaged with said engagement end that has passed through a forward path of said loop groove, thereby locking said slider to said pushed position corresponding to said card set position; an escape path which, when said slider at said pushed position is further pushed, allows said engagement end to escape from a position a of engagement with said engagement portion to a start portion of a return path of said loop groove; and a stepped surface which, when said slider is to be retracted, is engaged with said engagement end that escapes to said return-path start portion, to block said engagement end from reversely moving, thereby retaining said engagement end in said return path, and said engagement end is elastically pressed against a bottom face of said escape path, wherein said bottom face of said escape path has an inclined surface of a rising gradient which is directed toward an upper edge of said stepped surface.

2. The card connector according to claim 1, wherein, at said position of said engagement end with said engagement portion, said loop groove is formed at a depth which is equal to a depth of said return-path start portion.

3. The card connector according to claim 1, wherein, at said position of said engagement end with said engagement portion, said loop groove is formed at a depth which is larger than a depth of said return-path start portion.

4. The card connector according to claim 1, wherein said upper edge of said stepped surface is divided into one edge which elongates along a bottom face of said return-path start portion, and another edge of a falling gradient which elongates from an end of said one edge toward a root of said engagement portion, and said inclined surface is divided into one inclined surface of a rising gradient which extends toward said one edge, and another inclined surface of a rising gradient which extends toward said other edge.

5. The card connector according to claim 1, wherein said upper edge of said stepped surface is divided into one edge which elongates along a bottom face of said return-path start portion, and another edge of a falling gradient which elongates from an end of said one edge toward a root of said engagement portion, said inclined surface is divided into one inclined surface of a rising gradient which extends toward said one edge, and another inclined surface of a rising gradient which extends toward said other edge, a base of said other inclined surface crosses said escape path, and a base of said one inclined surface is positioned on a step-like wall face which is opposed to said engagement portion to form said escape path.

6. The card connector according to claim 1, wherein said case has a body, and a sheet metal cover which is attached to said body, and a spring piece which is formed by inwardly stamping and raising said cover is in elastic contact with said engagement pin, whereby said engagement end is elastically pressed against said bottom face of said escape path.

* * * * *

UNITED STATES PATENT AND TRADEMARK OFFICE
CERTIFICATE OF CORRECTION

PATENT NO. : 6,890,195 B2  Page 1 of 1
APPLICATION NO. : 10/730989
DATED : May 10, 2005
INVENTOR(S) : Nagata It is certified that error appears in the above-identified patent and that said Letters Patent is hereby corrected as shown below:

Please make the following corrections in the claims:

Column 10, line 19, after the word "being" insert --disposed --

Column 12, line 7, after the word "cover" insert --and --

Signed and Sealed this

Eleventh Day of September, 2007

JON W. DUDAS
*Director of the United States Patent and Trademark Office*